US 8,588,565 B2

(12) United States Patent
Doerr

(10) Patent No.: US 8,588,565 B2
(45) Date of Patent: Nov. 19, 2013

(54) COHERENT OPTICAL DETECTOR HAVING A MULTIFUNCTIONAL WAVEGUIDE GRATING

(75) Inventor: Christopher R. Doerr, Middletown, NJ (US)

(73) Assignee: Alcatel Lucent, Paris (FR)

( * ) Notice: Subject to any disclaimer, the term of this patent is extended or adjusted under 35 U.S.C. 154(b) by 143 days.

(21) Appl. No.: 13/203,854

(22) PCT Filed: Mar. 20, 2009

(86) PCT No.: PCT/US2009/037746
§ 371 (c)(1),
(2), (4) Date: Aug. 30, 2011

(87) PCT Pub. No.: WO2010/107439
PCT Pub. Date: Sep. 23, 2010

(65) Prior Publication Data
US 2012/0045173 A1 Feb. 23, 2012

(51) Int. Cl.
*G02B 6/34* (2006.01)
(52) U.S. Cl.
USPC .............................................. 385/37; 385/48
(58) Field of Classification Search
None
See application file for complete search history.

(56) References Cited

U.S. PATENT DOCUMENTS

| 4,114,257 A | 9/1978 | Bellavance |
| 4,553,811 A | 11/1985 | Becker et al. |
| 4,718,120 A | 1/1988 | Tzeng |
| 5,060,312 A | 10/1991 | Delavaux |
| 5,333,000 A | 7/1994 | Hietala et al. |
| 5,416,628 A | 5/1995 | Betti et al. |
| 5,448,581 A | 9/1995 | Wu et al. |
| 5,463,461 A | 10/1995 | Horiuchi et al. |
| 5,539,850 A | 7/1996 | Henry et al. |
| 6,014,256 A | 1/2000 | Cheng |
| 6,259,529 B1 | 7/2001 | Sorin et al. |
| 7,058,259 B2 | 6/2006 | Stuart |
| 7,065,272 B2 | 6/2006 | Taillaert et al. |
| 7,116,478 B2 | 10/2006 | Momoki et al. |
| 7,269,356 B2 | 9/2007 | Winzer |
| 7,343,104 B2 | 3/2008 | Doerr et al. |
| 2002/0113938 A1 | 8/2002 | Galpern et al. |
| 2002/0179912 A1 | 12/2002 | Batchko et al. |
| 2003/0095737 A1 | 5/2003 | Welch et al. |
| 2003/0175005 A1 | 9/2003 | Bauer et al. |

(Continued)

FOREIGN PATENT DOCUMENTS

| CN | 101203783 A | 6/2008 |
| EP | 0 465 425 A1 | 1/1992 |

(Continued)

OTHER PUBLICATIONS

Examiner's Office Letter; Mailed Dec. 25, 2012 for the corresponding JP Application No. JP 2012-50774.

(Continued)

*Primary Examiner* — Jerry Rahll
(74) *Attorney, Agent, or Firm* — Mendelsohn, Drucker & Associates, P.C.

(57) ABSTRACT

A coherent optical detector having a waveguide circuit, in which a plurality of waveguides are connected to a waveguide grating. In a representative embodiment, the waveguide grating serves at least three different functions, e.g., those of a fiber-optic coupler, a polarization splitter, and two power splitters, one for each of two orthogonal polarizations. Various embodiments of the coherent optical detector can be used to demodulate various forms of polarization-division-multiplexed (PDM) QAM- and/or PSK-modulated optical communication signals.

19 Claims, 3 Drawing Sheets

(56) References Cited

U.S. PATENT DOCUMENTS

| | | | |
|---|---|---|---|
| 2003/0185514 | A1 | 10/2003 | Bendett et al. |
| 2003/0235370 | A1 | 12/2003 | Taillaert et al. |
| 2005/0286911 | A1 | 12/2005 | Doerr et al. |
| 2006/0013296 | A1 | 1/2006 | Carrer et al. |
| 2006/0029323 | A1 | 2/2006 | Nikonov et al. |
| 2006/0285792 | A1 | 12/2006 | Spillane et al. |
| 2007/0036555 | A1 | 2/2007 | Chen et al. |
| 2007/0196042 | A1 | 8/2007 | Little |
| 2007/0297806 | A1 | 12/2007 | Kaneda et al. |
| 2008/0145066 | A1 | 6/2008 | Hoshida |
| 2008/0152361 | A1 | 6/2008 | Chen et al. |
| 2008/0152362 | A1 | 6/2008 | Koc |
| 2008/0152363 | A1 | 6/2008 | Koc |
| 2008/0267638 | A1 | 10/2008 | Nakashima et al. |
| 2010/0046886 | A1 | 2/2010 | Doerr |
| 2010/0054761 | A1 | 3/2010 | Chen et al. |
| 2010/0158521 | A1 | 6/2010 | Doerr et al. |

FOREIGN PATENT DOCUMENTS

| | | |
|---|---|---|
| EP | 0640854 A2 | 3/1995 |
| JP | 7064033 A | 3/1995 |
| JP | 2003234532 A | 8/2003 |
| JP | 2004096137 A | 3/2004 |
| TW | 595136 B | 6/2004 |
| WO | 8607513 | 12/1986 |
| WO | 0109655 A1 | 2/2001 |
| WO | 2004054138 | 6/2004 |
| WO | 2007149351 A2 | 12/2007 |
| WO | 2008122607 A1 | 10/2008 |
| WO | WO2009035513 A1 | 3/2009 |

OTHER PUBLICATIONS

Chinese Office Action; Mailed Jan. 22, 2013 for the corresponding CN Application No. CN 2009801582191.

Cho, Pak S., et al., "Investigation of 2-b/s/Hz 40-Gb/s DWDM Transmission Over 4 100 km SMF-28 Fiber Using RZ-DQPSK and Polarization Multiplexing," IEEE Photonics Technology Letters, Vol. 16, No. 2, Feb. 2004, 1041-1135/04, pp. 656-658.

CL-QOH-90 Quadrature Optical Hybrid, www.celight.com, 2005, Retrieved from the Internet: <URL: http://www.celight.com/images/pdfs/CL-QOH-90/4/2005.pdf> (1 page).

"Optical Hybrid Enables Next-Generation Optical Communication," www.optoplex.com, Retrieved from the Internet: <URL:http://www.optoplex.com/PDF/coherent_detection_and_optical_hybrid.pdf pp. 1-5.

Doerr, C., et al., "Measurement of Eye Diagrams and Constellation Diagrams of Optical Sources Using Linear Optics and Waveguide Technology, "Journal of Lightwave Technology, Vol. 23, No. 1, January 2005, 0733-8724, pp. 178-186.

Kylia Interferometers mint-2x4 mint-2x8 single and dual polarisation 90°optical hybrid, www.kylia.com, 2004, Datasheet Retrieved from the Internet: <URL:http://www.kylia.com> (1 page).

Seimetz, Matthias, et al., "Options, Feasibility, and Availability of 2 x 4 90° Hybrids for Coherent Optical Systems," Journal of Lightwave Technology, Vol. 24, No. 3, March 2006, 0733-8724, pp. 1317-1322.

Kazovsky, L.G., "Phase- and Polarization-Diversity Coherent Optical Techniques," Journal of Lightwave Technology, Vol. 7, Issue 2, Feb. 1989, pp. 279-292.

Van Laere, Frederik, et al., "Efficient Polarization Diversity Grating Couplers in Bonded InP-Membrane," IEEE Photonics Technology Letters, vol. 20, No. 4, Feb. 15, 2008, pp. 318-320.

Van Laere, F., et al, "Compact and Efficient Fibre-to-Waveguide Grating Couplers in InP-Membrane," Electronics Letters, vol. 42 No. 6, Mar. 16, 2006 (2 pages).

Van Laere, Frederik, et al., "Compact Slanted Grating Couplers Between Optical Fiber and InP-InGaAsP Waveguides," IEEE Photonics Technology Letters, vol. 19, No. 6, March 15, 2007, pp. 396-398.

Doerr, Christopher R., PCT International Search Report dated Aug. 26, 2009, for International Application No. PCT/US09/37746 filed on Mar. 20, 2009 (7 pages).

Taillaert, Dirk, et al., "A Compact Two-Dimensional Grating Coupler Used As a Polarization Splitter," IEEE Photonics Technology Letters, vol. 15, No. 9, Sep. 9, 2003, pp. 1249-1251.

Roelkens, Gunther, et al., "Silicon-on-Insulator Ultra-Compact Duplexer Based on a Diffractive Grating Structure," Optics Express, OAS, Washington, DC, vol. 15, No. 16, Aug. 6, 2007, pp. 10019-10096.

Heismann, F., et al., "Automatic Polarisation Demultiplexer for Polarisation-Multiplexed Transmission Systems," Electronics Letters, IEE Stevenge, GB vol. 29, No. 22, Oct. 28, 1993, pp. 1965-1966.

Griffin, R.A., et al., "Optical Differential Quadrature Phase-Shift Key (oDQPSK) for High Capacity Optical Transmission," Optical Fiber Communications Conference, Postconference Technical Digest, Postdeadline Papers (IEEE CAT. No. 02CH37339) PTO SOC. America Washington DC, USE; [Trends in Optics and Photonics Series. (TOPS)], vol. TOPS., vol. 70, Mar. 17, 2002, pp. 367-368.

Ezra, Ip, et al., "Coherent Detection in Optical Fiber Systems," Retrieved from the Internet: <URL:http://www,stanford.edu/Wavelet/pubs/Coherent_Detection_invited.pdf> [Retrieved on Apr. 25, 2008] (37 pages).

Doerr, Christopher, et al., PCT International Search Report and the Written Opinion of the International Searching Authority dated Mar. 29, 2010, for PCT/US2009/067252 filed on Dec. 09, 2009 (14 pages).

Chen, Young-Kai, et al., PCT International Search Report dated Feb. 26, 2010, for International Application No. PCT/US2009/004600 filed on Aug. 12, 2009 (3 pages).

Doerr, Christopher, et al., U.S. Appl. No. 12/391,039, filed Feb. 23, 2009 (34 pages).

Yamashita, S. and Okoshi, T., "Suppression of Common-Mode Beat Noise from Optical Amplifiers Using a Balanced Receiver," Electronics Letters, vol. 28, No. 21., Oct. 1992, pp. 1970-1972.

Ryu, S. and Horiuchi, Y., "Use of an Optical Amplifier in a Coherent Receiver," IEEE Photonics Technology Letters, vol. 3, No. 7, Jul. 1991, pp. 663-665.

Carena, A. et al., "Dynamic Range of Single-Ended Detection Receivers for 100GE Coherent PM-QPSK," IEEE Photonics Technology Letters, vol. 20, No. 15, Aug. 1 2008, pp. 1281-1283.

Takeuci, H. et al. "Monolithic Integrated Coherent Receiver on InP Substrate," IEEE Photonics Technology Letters, vol. 1, No. 11, Nov 1989, pp. 398-400.

Doerr, C., et al., "Monolithic 80-Gb/s Dual-Polarization On-Off-Keying Modulator in InP," Optical Fiber Communication Conference, National Fiber Optic Engineers Conference, PDP19.pdf, Feb. 2008 (3 pages).

Doerr, C.R., et al., "Monolithic Demodulator for 40-Gb/s DPQSK Using a Start Coupler," Journal of Lightwave Technology, vol. 24, No. 1., Jan. 2006, pp. 171-174.

Doerr, C.R., et al., "High-Speed InP DQPSK Receiver," Optical Fiber Communication Conference, PDP23.pdf, Feb. 2008 (3 pages).

Han, Y. And Li, G., "Coherent optical communication using polarization multiple-input-multiple-output," Optics Express, vol. 13, No. 19, Sep. 2005, pp. 7527-7534.

Leven, A., et al., "Coherent Receivers for Practical Optical Communications Systems," Optical Fiber Communication and the National Fiber Optic Engineers Conference, Mar. 2007, OThK4.pdf (3 pages).

Ngarajan, R., et al. "Large-Scale Photonic Integrated Circuits", IEEE Journal of Selected Topics in Quantum Electronics, vol. 11, No. 1, Jan./Feb. 2005, pp. 50-65.

Deri, R.J., et al. "Ultracompact Monolithic Integration of Balanced, Polarization Diversity Photodetectors for Coherent . Lightwave Receivers," IEEE Photonics Technology Letters., vol. 4, No. 11, Nov. 1992, 1238-1240.

Derr, Frowin., "Coherent Optical QPSK Intradyne System Concept and Digital Receiver Realization," Journal of Lightwave Technology, vol. 10, No. 9 Sep. 1992, pp. 1290-1296.

Koch, T.L., et al., "GaInAs/GaInAsP Multiple-Quantum-Well Integrated Heterodyne Receiver," Electronics Letters, vol. 25, No. 24, Nov. 1989, pp. 1621-1623.

(56) References Cited

OTHER PUBLICATIONS

Vermeulen, D., et al., "Silicon-on-Insulator Nanophotonic Waveguide Circuit for Fiber-to-the-Home Transceivers," 34th European Conference on Optical Communication, ECOC 2008, Tu3C6 (2 pages).

Wang, J., et al., "Evanescent-Coupled Ge p-i-n. Photodetectors on Si-Waveguide With SEG-Ge and Comparative Study of Lateral and Vertical p-i-n. Configurations," IEEE Electron Device Letters, vol. 29, No. 5, May 2008, pp. 445-448.

Doerr, C.R., et al., "Simultaneous Reception of Both Quadratures of 40-Gb/s DQPSK using a simple monolithic demodulator," Optical Fiber Communication Conference, 2005. Technical Digest, OFC/NFOEC, Mar. 2005, vol. 5 (3 pages).

Notice of Preliminary Rejection; Mailed on Mar. 20, 2013 for the corresponding KR Application No. 2011-7021860.

Chinese Office Action; Mailed Jun. 4, 2013 for corresponding CN Application No. 201080057169.0.

140

100

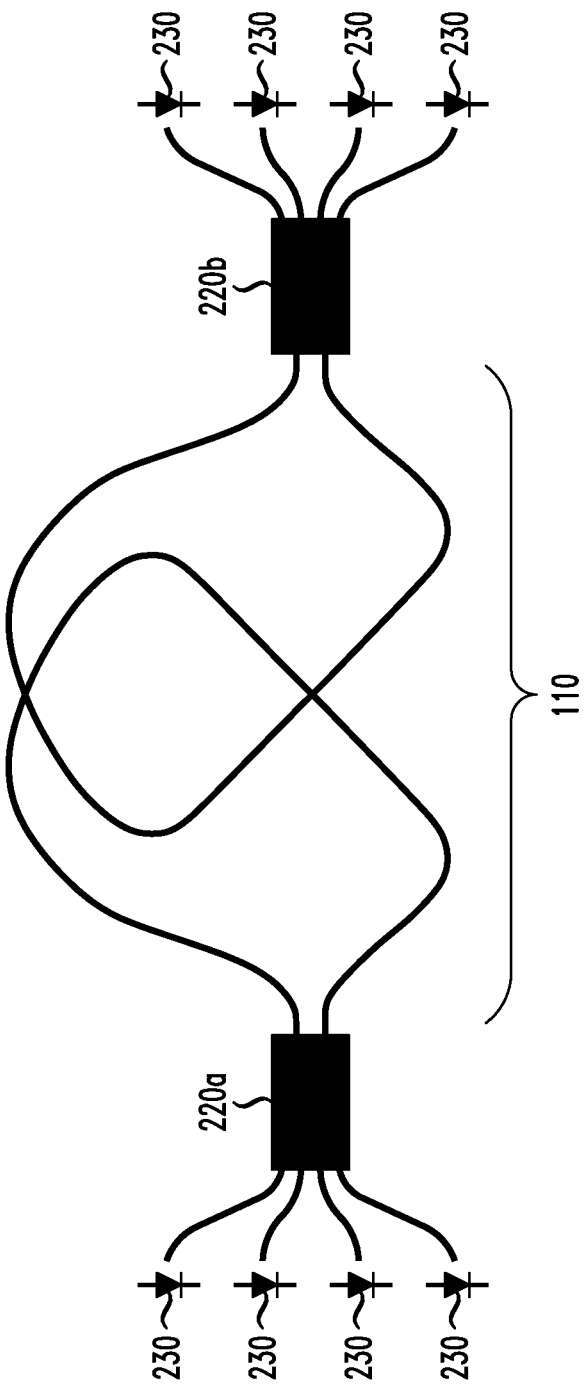

300

COHERENT OPTICAL DETECTOR HAVING A MULTIFUNCTIONAL WAVEGUIDE GRATING

CROSS-REFERENCE TO RELATED APPLICATIONS

The subject matter of this application is related to the subject matters of U.S. patent application Ser. No. 12/229,983, filed Aug. 28, 2008, and entitled "Monolithic Coherent Optical Detectors" and U.S. patent application Ser. No. 12/338,492, filed Dec. 18, 2008, and entitled "Optical Mixer for Coherent Detection of Polarization-Multiplexed Signals," both of which are incorporated herein by reference in their entirety.

BACKGROUND

1. Field of the Invention

The present invention relates to optical communication equipment and, more specifically but not exclusively, to coherent detectors for optical receivers.

2. Description of the Related Art

This section introduces aspects that may help facilitate a better understanding of the invention(s). Accordingly, the statements of this section are to be read in this light and are not to be understood as admissions about what is in the prior art or what is not in the prior art.

A coherent optical-detection scheme is capable of detecting not only the amplitude of an optical signal, but also the signal's polarization and phase. These capabilities make coherent optical detection compatible with polarization-division multiplexing and with the use of spectrally efficient modulation formats, such as quadrature amplitude modulation (QAM) and phase-shift keying (PSK) in its various forms (e.g., differential PSK (DPSK) and differential quadrature PSK (DQPSK)). Compared to incoherent detectors, coherent optical detectors offer relatively easy wavelength tunability, good rejection of interference from adjacent channels in dense wavelength-division-multiplexing (DWDM) systems, linear transformation of the electromagnetic field into an electrical signal for effective application of modern digital signal processing techniques, and an opportunity to use polarization-division multiplexing. As a result, coherent optical detectors are currently being actively developed.

SUMMARY

Disclosed herein are various embodiments of a coherent optical detector having a waveguide circuit, in which a plurality of waveguides are connected to a waveguide grating. In a representative embodiment, the waveguide grating serves at least three different functions, e.g., those of a fiber-optic coupler, a polarization splitter, and two power splitters, one for each of two orthogonal polarizations. Various embodiments of the coherent optical detector can be used to demodulate various forms of polarization-division-multiplexed (PDM) QAM- and/or PSK-modulated optical communication signals.

According to one embodiment, provided is an apparatus having a first waveguide grating and a first plurality of waveguides connected to the first waveguide grating. The first plurality comprises a first waveguide and a second waveguide collinear with the first waveguide at the first waveguide grating. Optical power of a first polarization of a first optical signal applied to the first waveguide grating is split and coupled by the first waveguide grating into the first and second waveguides. If the first optical signal comprises a component having a first carrier wavelength, then optical power of the first polarization of that component is split and coupled by the first waveguide grating into the first and second waveguides.

BRIEF DESCRIPTION OF THE DRAWINGS

Other aspects, features, and benefits of various embodiments of the invention will become more fully apparent, by way of example, from the following detailed description and the accompanying drawings, in which:

FIG. 2 shows a schematic top view of a differential optical detector according to another embodiment of the invention.

DETAILED DESCRIPTION

Figure 1B:
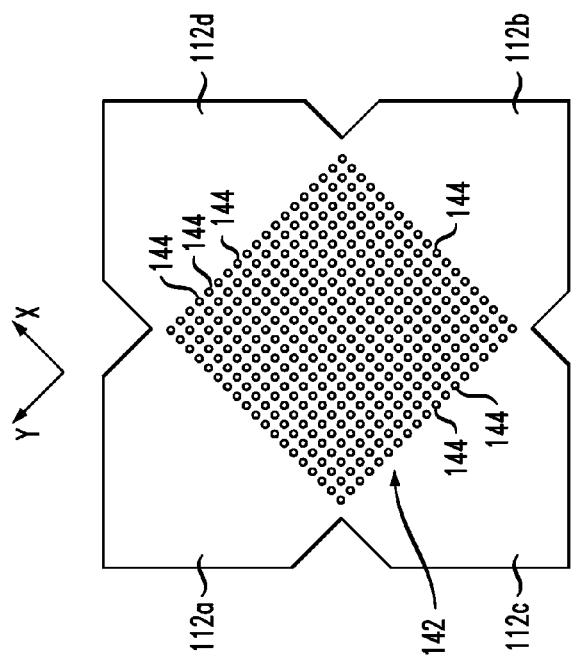
FIGS. 1A-B schematically show a differential optical detector according to one embodiment of the invention.
Figure 1A:
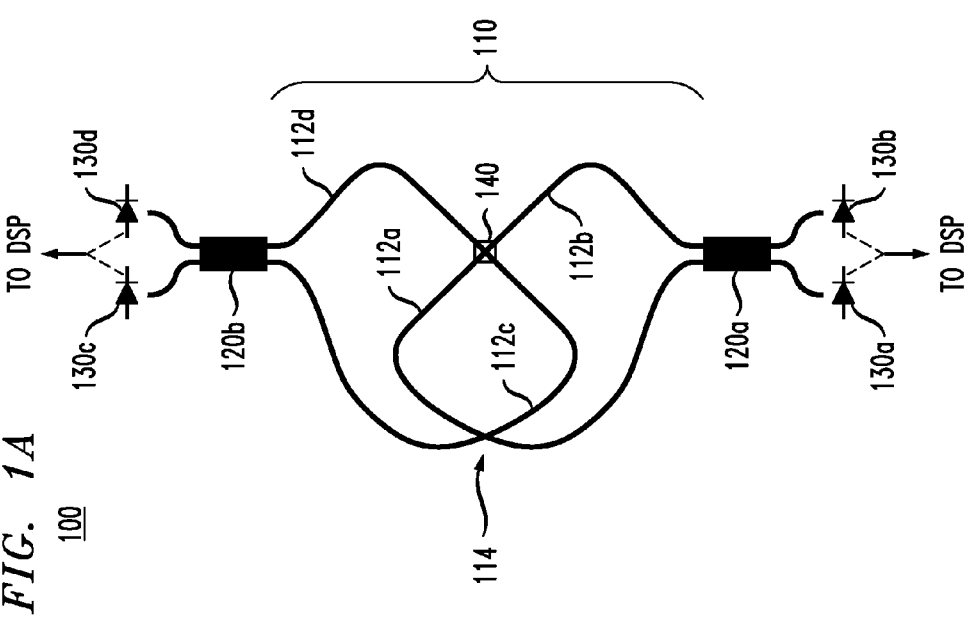

FIGS. 1A-B schematically show a differential optical detector 100 according to one embodiment of the invention. More specifically, FIG. 1A shows a schematic top view of detector 100. FIG. 1B shows an enlarged top view of a fiber-optic coupling region 140 of detector 100. Detector 100 can be used, e.g., for optical differential phase-shift-keying (DPSK) demodulation of polarization-division multiplexed (PDM) communication signals. Alternatively or in addition, detector 100 can be used for demodulation of a non-PDM DPSK communication signal in a polarization-independent manner. As known in the art, a DPSK demodulator operates to convert an optical DPSK signal into an intensity-keyed signal and is usually used at a receiver of a fiber-optic communication network. As used herein, the term "PDM signal" refers to an optical signal that comprises two independently modulated components having the same wavelength, but orthogonal states of polarization.

Detector 100 has a waveguide circuit 110 that is optically coupled, via two 2×2 optical couplers 120a-b, to four photo-detectors (e.g., photodiodes) 130a-d. In one embodiment, waveguide circuit 110, optical couplers 120a-b, and photodetectors 130a-d are all implemented in a monolithic photonic integrated circuit (PIC) using integration techniques disclosed, e.g., in the above-cited U.S. patent application Ser. No. 12/229,983. Other known integration techniques may likewise be used.

Referring to FIG. 1B, coupling region 140 of waveguide circuit 110 has a waveguide grating 142. In a representative embodiment, grating 142 comprises a plurality of cavities, pillars, and/or holes 144 etched into or formed on an upper surface of a ridge waveguide to form a two-dimensional, rectangular or square pattern. Each of the four sides of grating 142 is connected to a corresponding one of ridge waveguides 112a-d. In coupling region 140, waveguides 112a-b are collinear with each other and orthogonal to waveguides 112c-d, which are similarly collinear with each other. A grating that can be used as grating 142 is disclosed, e.g., in U.S. Pat. No. 7,065,272, which is incorporated herein by reference in its entirety.

In detector 100, grating 142 serves at least three different functions, e.g., those of (1) a fiber-optic coupler, (2) a polarization splitter, and (3) two power splitters, one for each of two orthogonal polarizations of the optical input signal. More specifically, if grating 142 is physically abutted with a single-mode optical fiber, e.g., oriented orthogonally with respect to the upper surface of the grating (i.e., perpendicular to the plane of FIGS. 1A-B), then light from the optical fiber will couple, with relatively low losses, from the optical fiber into waveguides 112a-d, hence the fiber-optic-coupler functionality of grating 142. If the light in the optical fiber has two polarization components, e.g., an X-polarization component and a Y-polarization component, then the X-polarization component will couple into waveguides 112a-b and the Y-polarization component will couple into waveguides 112c-d, hence the polarization-splitter functionality of grating 142. The coupled optical power of the X polarization will be divided substantially evenly between waveguides 112a-b, hence the power-splitter functionality of grating 142 for the X polarization. Similarly, the coupled optical power of the Y polarization will be divided substantially evenly between waveguides 112c-d, hence the power-splitter functionality of grating 142 for the Y polarization. Note that, if the optical input signal has a single carrier wavelength, then all three of the above-described functions apply to the signal component having that carrier wavelength. If the optical input signal has multiple carrier wavelengths, then each of the signal components corresponding to different carrier wavelengths is subjected to each of the three above-described functions.

The fiber-optic coupling efficiency of grating 142 can be optimized for any selected wavelength or a range or wavelengths by using a corresponding appropriate pattern of cavities or holes 144. For example, the above-cited U.S. Pat. No. 7,065,272 discloses patterns that can be used for efficiently coupling light having wavelengths between about 1500 nm and about 1600 nm. One skilled in the art will appreciate that, to obtain a grating suitable for efficient coupling of other wavelengths, the disclosed patterns can be modified, e.g., by appropriately changing the periodicity of cavities or holes in the grating.

In a representative embodiment of waveguide circuit 110, the X polarization from an abutted optical fiber efficiently couples into and propagates along each of waveguides 112a-b as a corresponding transverse electric (TE) waveguide mode. The X polarization couples into waveguides 112c-d relatively inefficiently, and this coupling is negligible for all practical purposes. Similarly, the Y polarization from the abutted optical fiber couples (i) efficiently into each of waveguides 112c-d as a corresponding TE waveguide mode and (ii) negligibly into waveguides 112a-b.

Referring back to FIG. 1A, for each of the X and Y polarizations of an optical communication signal applied to grating 142, detector 100 achieves DPSK demodulation by comparing the phases of two sequential bits. For example, grating 142 splits the X polarization of the incoming DPSK signal into two beams and couples those beams into waveguides 112a-b, respectively, which direct the beams to 2×2 optical coupler 120a. Waveguides 112a-b have an optical-path difference that introduces a time delay corresponding to the optical-symbol period (bit length) of the DPSK signal when the two beams arrive at the input side of optical coupler 120a. Optical coupler 120a coherently recombines the received beams to produce two optical interference signals corresponding to adjacent optical bits of the DPSK signal. The two interference signals are applied to photo-detectors 130a-b, respectively, which are coupled to the output side of optical coupler 120a. Photo-detectors 130a-b convert each of the interference signals into a corresponding intensity-keyed electrical signal. In one embodiment, photo-detectors 130a-b are electrically connected, as known in the art, to implement a balanced detection scheme. The Y polarization of the incoming DPSK signal is processed in detector 100 similar to the X polarization, but in the detector portion having waveguides 112c-d, 2×2 optical coupler 120b, and photo-detectors 130c-d. If detector 100 receives a PDM optical communication signal, then the electrical signals generated by photo-detectors 130a-b are treated as corresponding to one of the PDM data streams, and the electrical signals generated by photo-detectors 130c-d are treated as corresponding to one another of the PDM data streams. If detector 100 receives a non-PDM signal, then the electrical signals generated by photo-detectors 130a-b and 130c-d can be added together to produce a response that is substantially independent of the state of polarization of the optical communication signal.

Waveguides 112a and 112c intersect to create a waveguide crossing 114. The angle between waveguides 112a and 112c in waveguide crossing 114 is typically between about 80 and about 100 degrees. In one embodiment, to reduce crosstalk between waveguides 112a and 112c, waveguide crossing 114 incorporates one or more multimode-interference (MMI) lenses as disclosed, e.g., in U.S. Pat. No. 7,058,259, which is incorporated herein by reference in its entirety.

An optical communication link between the remote transmitter and detector 100 imposes a generally uncontrolled polarization rotation onto the DPSK signal before this signal is applied to waveguide grating 142. However, digital signal-processing (DSP) techniques can be used, as known in the art, to process the electrical signals generated by photo-detectors 130a-d in a manner that substantially compensates for that polarization rotation and enables the receiver having detector 100 to fully recover two independent, PDM data streams carried by the DPSK signal. Representative DSP techniques that can be adapted to achieve the requisite polarization-rotation compensation is disclosed, e.g., in U.S. Patent Application Publication Nos. 2008/0152362 and 2008/0152363, both of which are incorporated herein by reference in their entirety.

FIG. 2 shows a schematic top view of a differential optical detector 200 according to another embodiment of the invention. Detector 200 can be used, e.g., for optical differential quadrature-phase-shift-keying (DQPSK) demodulation of PDM communication signals or polarization-insensitive demodulation of non-PDM communication signals. As known in the art, DQPSK modulation uses transitions between four points on a constellation diagram, the points being equispaced on a circle centered on the origin. With four different phase increments (i.e., 0, 90, 180, and −90 degrees) corresponding to various possible transitions, DQPSK encodes two bits per transition.

Similar to detector 100, detector 200 employs waveguide circuit 110. However, detector 200 differs from detector 100 in that, in detector 200, waveguide circuit 110 is optically coupled to two 2×4 optical couplers 220a-b rather than 2×2 optical couplers 120a-b. The four output ports of each optical coupler 220 are coupled to four corresponding photo-detectors 230. The use of a 2×4 optical coupler acting as an optical 90-degree hybrid for the demodulation of a DQPSK signal is disclosed, e.g., in U.S. Pat. No. 7,343,104, which is incorporated herein by reference in its entirety. Briefly, the two input signals to a 2×4 optical coupler interfere therein so that the output port(s) at which the interference signal appears depends on the phase difference between the input signals. As a result, the signals generated by the four photo-detectors 230 coupled to a 2×4 optical coupler 220 can be used to unambiguously determine the phase increment between two consecutive optical DQPSK symbols and, hence, the corresponding two bits encoded thereby.

In detector 200, waveguide circuit 110 performs polarization splitting as described above in reference to FIG. 1. Optical coupler 220a and the four photo-detectors 230 coupled thereto perform demodulation of the X polarization of the DQPSK communication signal applied to grating 140. Similarly, optical coupler 220b and the four photo-detectors 230 coupled thereto perform demodulation of the Y polarization of that DQPSK communication signal.

Figure 3:
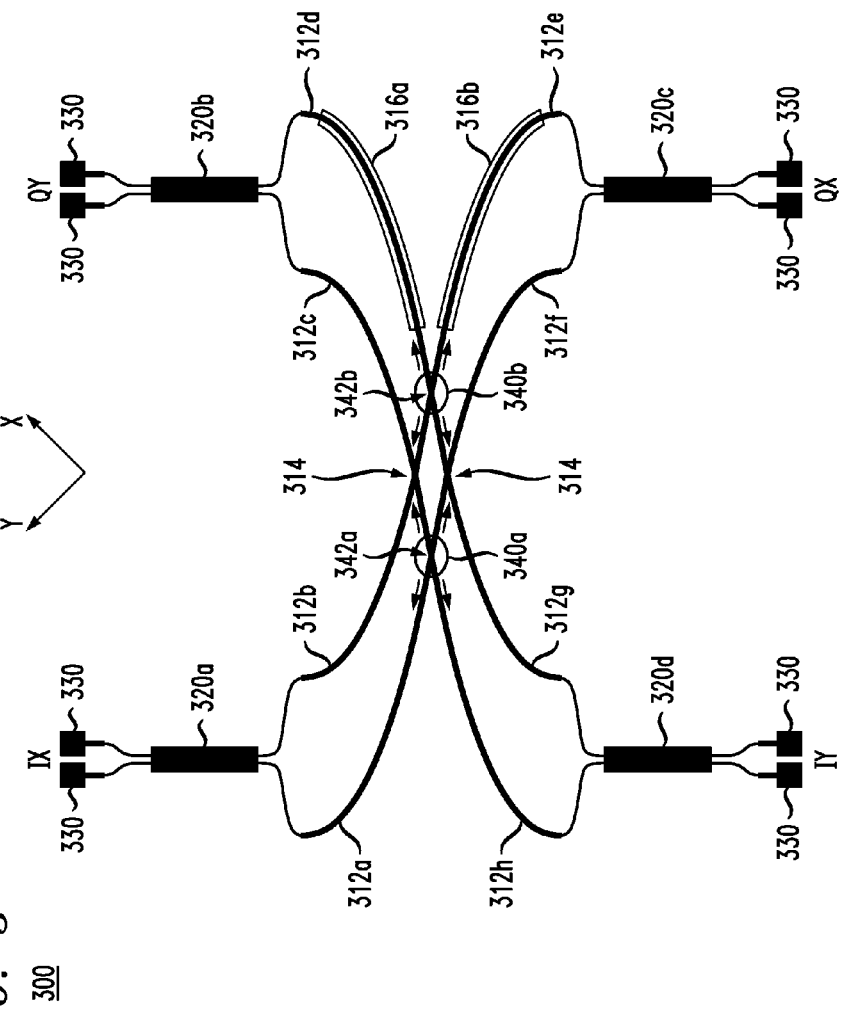
FIG. 3 shows a schematic top view of a coherent optical detector according to yet another embodiment of the invention.

FIG. 3 shows a schematic top view of a coherent optical detector 300 according to yet another embodiment of the invention. Detector 300 can be used, e.g., for optical quadrature-phase-shift-keying (QPSK) or QAM reception of PDM communication signals. As known in the art, QPSK modulation uses four points on a constellation diagram, which points are equispaced on a circle centered on the origin. QAM modulation uses two carrier waves that are out of phase with each other by about 90 degrees. These waves are usually referred to as the in-phase and quadrature-phase components of the QAM signal. QPSK modulation can be considered as a special case of QAM modulation and is often referred to as 4-QAM. The number of bits encoded by a QAM symbol depends on the constellation size and can be two, three, or more bits per optical symbol.

Detector 300 has a waveguide circuit 310 that is optically coupled, via four 2×2 optical couplers 320a-d, to eight photo-detectors 330. Optical couplers 320 and photo-detectors 330 of detector 300 are analogous to optical couplers 120 and photo-detectors 130, respectively, of detector 100 (see FIG. 1). Unlike waveguide circuit 110, waveguide circuit 310 has two coupling regions 340a-b, each having a waveguide grating 342 that is similar to waveguide grating 142 (see FIG. 1B). Each waveguide grating 342 is connected to four corresponding waveguides 312. Note that FIG. 3 is drawn not to scale and, at each grating 342, the corresponding waveguides 312 are arranged in an orthogonal/collinear manner, e.g., as indicated in FIG. 1B.

All waveguides 312 have the same path length between the corresponding waveguide grating 342 and the input side of the corresponding optical coupler 320. Each of waveguides 312d-e has a corresponding one of phase shifters 316a-b. In one embodiment, each phase shifter 316 comprises an electrode deposited over the core of the corresponding waveguide 312. If the electrode is biased, then the electric field generated due to the bias induces a corresponding change in the refraction index of the material of the waveguide core, which changes the phase shift for the light wave traveling along the waveguide. Electrical leads connected to photo-detectors 330 and phase shifters 316 are omitted in FIG. 3 for clarity. Waveguide circuit 310 has two waveguide crossings 314, each of which is analogous to waveguide crossing 114 of waveguide circuit 110 (see FIG. 1).

In operation, coupling regions 340a-b are used to couple a received (e.g., QAM) optical communication signal and a local oscillator (LO) signal, respectively, into detector 300. In a representative coupling arrangement, an optical fiber carrying the optical communication signal is abutted with waveguide grating 342a in coupling region 340a. Another optical fiber carrying the LO signal is similarly abutted with waveguide grating 342b in coupling region 340b. Both optical fibers are oriented perpendicular to the plane of waveguide circuit 310 (i.e., perpendicular to the plane of FIG. 3).

In a representative configuration of detector 300, the polarization of the LO signal is chosen so that the electric-field vector is parallel to a diagonal of waveguide grating 342b. One skilled in the art will appreciate that this state of polarization results in approximately equal LO power being coupled into each of waveguides 312b,d,e,g. Each of phase shifters 316a-b is biased to apply a 90-degree phase shift to the LO signal directed from waveguide grating 342b to the corresponding one of optical couplers 320b and 320c. One purpose of having phase shifter 316b is to ensure that the relative phase shift between two interferometer arms having waveguides 312a-b is equal to the relative phase shift between two interferometer arms having 312e-f plus or minus 90 degrees. Similarly, one purpose of phase shifter 316a is to ensure that the relative phase shift between two interferometer arms having waveguides 312c-d is equal to the relative phase shift between two interferometer arms having waveguides 312g-h plus or minus 90 degrees. In one embodiment, phase shifter 316a can be moved from waveguide 312d to waveguide 312c, 312g, or 312h. A similar relocation is possible for phase shifter 316b. More generally, various embodiments of detector 100 may have two variously located phase shifters, as long as those phase shifters are associated with the interferometers that process different polarizations.

In one embodiment, the eight photo-detectors 330 in detector 300 are electrically connected, e.g., as disclosed in the above-cited U.S. patent application Ser. Nos. 12/229,983 and 12/338,492 and U.S. Patent Application Publication Nos. 2008/0152362 and 2008/0152363, to form four balanced photo-detector pairs. More specifically, each balanced photo-detector pair has two photo-detectors 330 coupled to the same optical coupler 320. The balanced photo-detector pair coupled to optical coupler 320a detects an optical signal produced by the interference of an X-polarization component of the optical communication signal applied to grating 342a and an X-polarization component of the LO signal applied to grating 342b. The balanced photo-detector pair coupled to optical coupler 320b detects an optical signal produced by the interference of a Y-polarization component of the optical communication signal applied to grating 342a and a 90-degree phase-shifted Y-polarization component of the LO signal applied to grating 342b. The balanced photo-detector pair coupled to optical coupler 320c detects an optical signal produced by the interference of an X-polarization component of the optical communication signal applied to grating 342a and a 90-degree phase-shifted X-polarization component of the LO signal applied to grating 342b. The balanced photo-detector pair coupled to optical coupler 320d detects an optical signal produced by the interference of a Y-polarization component of the optical communication signal applied to grating 342a and a Y-polarization component of the LO signal applied to grating 342b. As a result, these four balanced photo-detector pairs of detector 300 measure (i) the in-phase component IX of the X polarization, (ii) the quadrature-phase component QY of the Y polarization, (iii) the quadrature-phase component QX of the X polarization, and (iv) the in-phase component IY of the Y polarization, respectively, of the optical communication signal applied to grating 342a.

The present inventions may be embodied in other specific apparatus and/or methods. The described embodiments are to be considered in all respects as only illustrative and not restrictive. In particular, the scope of the invention is indicated by the appended claims rather than by the description and figures herein. All changes that come within the meaning and range of equivalency of the claims are to be embraced within their scope. For example, although various coherent optical detectors of the invention were described in reference to PDM signals, certain principles of the invention are also applicable to demodulation of non-PDM signals. Various coherent optical detectors can be implemented as corresponding monolithic PICs, including implementations as substantially planar receiver cards or circuits. In one embodiment, a waveguide circuit of the invention can be implemented using silicon waveguides. Although embodiments of the invention were described in reference to ridge waveguides, other types of waveguides can also be used. Known DSP techniques can be used to process the electrical signals generated by the photo-detectors of the coherent optical detector in a manner that substantially compensates for the polarization rotation in the fiber link and enables the optical receiver to fully recover two independent PDM data streams carried by the received optical communication signal.

The description and drawings merely illustrate the principles of the invention. It will thus be appreciated that those of ordinary skill in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

It should be appreciated by those of ordinary skill in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Throughout the detailed description, the drawings, which are not to scale, are illustrative only and are used in order to explain, rather than limit the invention. The use of terms such as height, length, width, top, bottom, is strictly to facilitate the description of the invention and is not intended to limit the invention to a specific orientation. For example, height does not imply only a vertical rise limitation, but is used to identify one of the three dimensions of a three dimensional structure as shown in the figures. Such "height" would be vertical where the electrodes are horizontal but would be horizontal where the electrodes are vertical, and so on. Similarly, while all figures show the different layers as horizontal layers such orientation is for descriptive purpose only and not to be construed as a limitation.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

What is claimed is:

1. An apparatus, comprising:
   a first waveguide grating;
   a first plurality of waveguides connected to the first waveguide grating, wherein:
      the first plurality comprises a first waveguide and a second waveguide collinear with the first waveguide at the first waveguide grating; and
      the first waveguide grating is configured to split optical power of a first polarization of a first optical signal applied to the first waveguide grating and couple the optical power of the first polarization of the first optical signal into the first and second waveguides; and
   a first optical coupler, wherein:
      the first and second waveguides are connected to a first side of the first optical coupler;
      the first waveguide has a first length between the first waveguide grating and the first optical coupler; and
      the second waveguide has a second length between the first waveguide grating and the first optical coupler, the second length being different from the first length.

2. The apparatus of claim 1, wherein, if the first optical signal comprises a component having a first carrier wavelength, then the first waveguide grating is configured to split optical power of the first polarization of said component and couple the optical power of the first polarization of said component into the first and second waveguides.

3. The apparatus of claim 1, wherein:
   the first plurality further comprises a third waveguide orthogonal to the first and second waveguides at the first waveguide grating; and
   the first waveguide grating is further configured to couple optical power of a second polarization of the first optical signal into the third waveguide, the second polarization being orthogonal to the first polarization.

4. The apparatus of claim 3, wherein:
   the first plurality further comprises a fourth waveguide collinear with the third waveguide at the first waveguide grating; and
   the first waveguide grating is further configured to split the optical power of the second polarization of the first optical signal and couple the optical power of the second polarization of the first optical signal into the third and fourth waveguides.

5. The apparatus of claim 4, further comprising a second optical coupler, wherein:
   the third and fourth waveguides are connected to a first side of the second optical coupler;
   the third waveguide has the first length between the first waveguide grating and the second optical coupler; and
   the fourth waveguide has the second length between the first waveguide grating and the second optical coupler.

6. The apparatus of claim 5, wherein:
   the first optical signal is characterized by an optical-symbol period; and a difference in optical-signal propagation time through the first and second lengths of waveguide is approximately the optical-symbol period.

7. The apparatus of claim 5, further comprising a plurality of photo-detectors coupled to a second side of the first optical coupler and a second side of the second optical coupler.

8. The apparatus of claim 7, wherein, if the first optical signal is a polarization-division-multiplexed (PDM) differential phase-shift-keying (DPSK) signal, then the photo-detectors are configured to generate electrical signals indicative of data carried by the PDM DPSK signal.

9. The apparatus of claim 7, wherein, if the first optical signal is a polarization-division-multiplexed (PDM) differential quadrature-phase-shift-keying (DQPSK) signal, then the photo-detectors are configured to generate electrical signals indicative of data carried by the PDM DQPSK signal.

10. The apparatus of claim 1, wherein:
the first optical signal is characterized by an optical-symbol period; and
a difference in optical-signal propagation time through the first and second lengths of waveguide is approximately the symbol period.

11. The apparatus of claim 1, further comprising two photo-detectors coupled to a second side of the optical coupler, wherein, if the first optical signal is a differential phase-shift-keying (DPSK) signal, then the two photo-detectors are configured to generate electrical signals indicative of data carried by the DPSK signal.

12. The apparatus of claim 1, further comprising four photo-detectors coupled to a second side of the optical coupler, wherein, if the first optical signal is a differential quadrature-phase-shift-keying (DQPSK) signal, then the four photo-detectors are configured to generate electrical signals indicative of data carried by the DQPSK signal.

13. The apparatus of claim 1, wherein:
the first grating comprises a ridge waveguide having on a surface a plurality of cavities or holes that form a periodic two-dimensional pattern; and
the apparatus is configured to apply the first optical signal to said surface.

14. The apparatus of claim 1, wherein the first waveguide grating and the first plurality of waveguides are implemented in a monolithic photonic integrated circuit.

15. An apparatus comprising:
a first waveguide grating;
a first plurality of waveguides connected to the first waveguide grating, wherein:
the first plurality comprises a first waveguide and a second waveguide collinear with the first waveguide at the first waveguide grating; and
the first waveguide grating is configured to split optical power of a first polarization of a first optical signal applied to the first waveguide grating and couple the optical power of the first polarization of the first optical signal into the first and second waveguides;
a second waveguide grating; and
a second plurality of waveguides connected to the second waveguide grating, wherein:
the second plurality comprises a first waveguide and a second waveguide collinear with the first waveguide at the second waveguide grating; and
the second waveguide grating is configured to split optical power of the first polarization of a second optical signal applied to the second waveguide grating and couple the optical power of the first polarization of the second optical signal into the first and second waveguides of the second plurality.

16. The apparatus of claim 15, wherein:
the first plurality comprises a third waveguide and a fourth waveguide orthogonal to the first and second waveguides of the first plurality and collinear with each other at the first waveguide grating;
the second plurality comprises a third waveguide and a fourth waveguide orthogonal to the first and second waveguides of the second plurality and collinear with each other at the second waveguide grating;
the first waveguide grating is further configured to split optical power of a second polarization of the first optical signal and couple the optical power of the second polarization of the first optical signal into the third and fourth waveguides of the first plurality; and
the second waveguide grating is further configured to split optical power of the second polarization of the second optical signal and couple the optical power of the second polarization of the second optical signal into the third and fourth waveguides of the second plurality.

17. The apparatus of claim 16, further comprising first, second, third, and fourth optical couplers, wherein:
the first waveguide of the first plurality and the first waveguide of the second plurality are connected to a first side of the first optical coupler;
the second waveguide of the first plurality and the second waveguide of the second plurality are connected to a first side of the second optical coupler;
the third waveguide of the first plurality and the third waveguide of the second plurality are connected to a first side of the third optical coupler; and
the fourth waveguide of the first plurality and the fourth waveguide of the second plurality are connected to a first side of the fourth optical coupler.

18. The apparatus of claim 17, wherein the first, second, third, and fourth waveguides in the first and second pluralities have equal respective lengths between the corresponding waveguide grating and the corresponding optical coupler.

19. The apparatus of claim 17, wherein:
the second waveguide of the second plurality comprises a first phase shifter;
the third waveguide of the second plurality comprises a second phase shifter; and
the apparatus further comprises a plurality of photo-detectors coupled to second sides of the first, second, third, and fourth optical couplers, wherein, if:
the first optical signal is a polarization-division-multiplexed (PDM) quadrature-amplitude-modulation (QAM) signal;
the second optical signal is a local-oscillator signal; and
each of the first and second phase shifters sets a corresponding phase difference to about 90 degrees,
then the photo-detectors are configured to generate electrical signals indicative of data carried by the PDM QAM signal.

* * * * *